United States Patent [19]
Dahl

[11] Patent Number: 5,476,282
[45] Date of Patent: Dec. 19, 1995

[54] CONVERTIBLE TRANSPORT CART

[76] Inventor: Gary-Michael Dahl, 8300 Sands Point Dr. #903, Houston, Tex. 77036

[21] Appl. No.: 94,605

[22] Filed: Jul. 19, 1993

Related U.S. Application Data

[63] Continuation-in-part of Ser. No. 762,568, Sep. 17, 1991, Pat. No. 5,228,716.

[51] Int. Cl.$^6$ ............................................. B62B 3/02
[52] U.S. Cl. .................. 280/651; 280/47.18; 280/47.29; 280/47.34
[58] Field of Search ........................ 280/651, 35, 47.18, 280/47.27, 47.28, 47.29, 655, 655.1, 638, 47.34, 47.2

[56] References Cited

U.S. PATENT DOCUMENTS

| | | |
|---|---|---|
| 1,662,730 | 3/1928 | Wertenberger. |
| 2,263,879 | 11/1941 | Jorgensen ............................. 280/5.24 |
| 2,519,113 | 8/1950 | Cohn ........................................ 280/49 |
| 2,620,041 | 12/1952 | Chenette .................................. 180/9.1 |
| 2,820,643 | 1/1958 | Cohn ........................................ 280/34 |
| 3,104,890 | 8/1963 | Hill ........................................... 280/34 |
| 3,206,790 | 9/1965 | Romay ......................................... 16/35 |
| 3,423,103 | 1/1969 | Maltarp ................................ 280/655.1 |
| 3,759,538 | 9/1973 | Fabiano ................................. 280/47.35 |
| 3,761,107 | 9/1973 | Doeherty ................................. 280/348 |
| 3,837,667 | 9/1974 | Sernovitz .............................. 280/47.34 |
| 4,009,891 | 3/1977 | Jensen ..................................... 280/657 |
| 4,448,440 | 5/1984 | Gier ......................................... 280/655 |
| 4,637,626 | 1/1987 | Foss ......................................... 280/655 |
| 4,717,168 | 1/1988 | Moon, Sr. ............................... 280/641 |
| 4,796,909 | 1/1989 | Kirkendall .............................. 280/651 |
| 4,830,385 | 5/1989 | Wallick et al. ........................... 280/35 |
| 4,902,027 | 2/1990 | Skelly ................................ 280/33.998 |
| 5,070,725 | 2/1992 | Feldner ................................... 280/651 |
| 5,228,716 | 7/1993 | Dahl ........................................ 280/651 |

Primary Examiner—Margaret A. Focarino
Assistant Examiner—Michael Mar
Attorney, Agent, or Firm—Harrison & Egbert

[57] ABSTRACT

A convertible cart for transporting objects having a frame, a first handle connected to the frame, a second handle connected adjacent an opposite end of the frame, a plurality of wheels attached to the frame. Each of the handles is selectively movable between a first position generally perpendicular to the frame and a second position generally aligned with the frame. The wheels support the frame at a position parallel to the surface on which the wheels are placed. The frame has a longitudinal member extending centrally of the frame. The longitudinal member has an end offset from overlapping relationship with one end of the frame. A snap button is provided within the longitudinal member so as to limit telescoping movement of one portion of the longitudinal member with respect to another portion.

6 Claims, 4 Drawing Sheets

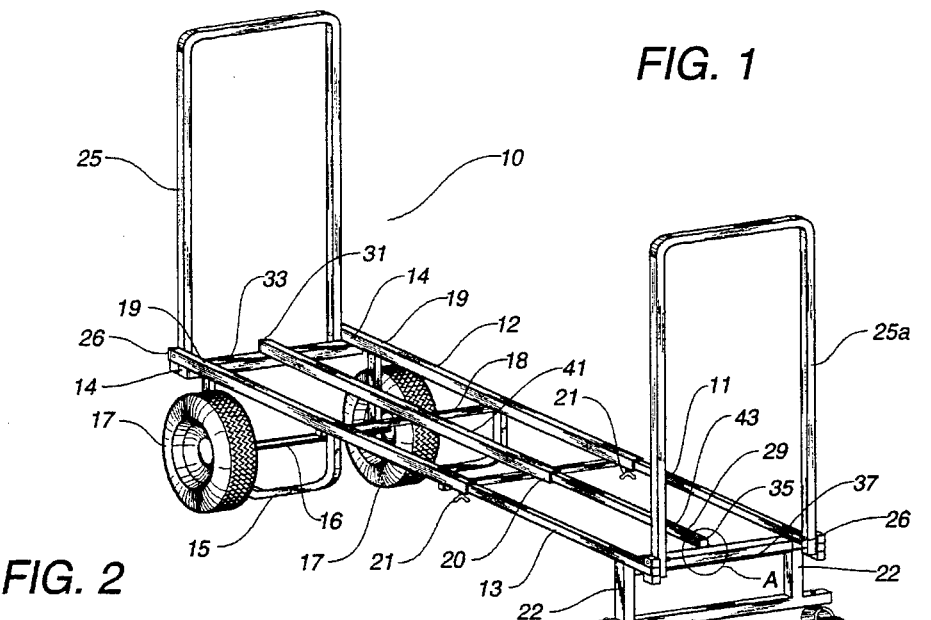

1

CONVERTIBLE TRANSPORT CART

RELATED APPLICATIONS

The present application is a continuation-in-part of U.S. patent application Ser. No. 07/762,568, filed on Sep. 17, 1991, and entitled "Convertible Transport Cart", now U.S. Pat. No. 5,228,716.

TECHNICAL FIELD

The present invention relates to hand trucks, dollies, and other land vehicles. More particularly, the present invention relates to lightweight, telescoping foldable and convertible hand trucks and/or platform carts which are used for transporting objects.

BACKGROUND ART

Many improvements have been made in the area of hand trucks and dollies for material handling. However, none of these improvements have efficiently and effectively addressed the needs of professional musicians. Professional musicians are required to transport wide varieties of musical instruments and related gear often utilizing small cars and trucks over various terrains and changing environments while travelling to and from performance sites. Due to the virtual explosion in technology over the last ten years regarding P.A. systems, electronic keyboards, effects and the like, musical groups require more equipment than ever before. The problems of transporting the above-mentioned equipment have become increasingly difficult. It is desirable to create a specialized dolly or cart that can satisfy the criteria of musicians.

In the past few years, mini-vans and small trucks have been placed in common use for the transport of musical and other equipment. As such, space limitations have become of great concern to musicians. Any transport carts must now have a size which can carry large loads yet collapse to a small storage size so as to leave maximum room for equipment with the mini-van. Space is at a premium within a mini-van or a small truck.

Initially, it is desirable to produce a lightweight cart weighing under thirty-five pounds. It has been found that professional musicians experience finger stiffening and muscle stiffening in the hands and forearms when lifting objects over forty pounds which is deleterious to musical performance. In addition, the carrying of heavy equipment can contribute to back problems and related physical impairment. In addition, it also tights laryngeal muscles and, thus, hampers singing performance.

When transporting musical equipment, any cart or dolly should be capable of supporting at least five hundred pounds or more. Musical equipment is delicate and should be transported smoothly and without shock. In addition, the musical equipment should be properly supported and handled with care. Any handtruck or dolly must be able to reduce to a size of three feet of length or less with one side flat so as to facilitate receipt in small cars or trucks and/or baggage handling in airports.

In order to effectively accommodate keyboards and large P.A. cabinets, a cart must have the ability to extend to approximately fifty-four inches. It should also be short enough to maneuver through labrinyth-like corridors and elevators, often found in hotels and stage areas. Support should be provided on each end of the cart so as to maintain the expensive and delicate equipment within the confines of the frame of the dolly. Tall foldable sides can be useful for securing equipment such as drums, guitars, horns and the like, as well as acting as a hanger for various stage clothes. Also, the cart should be able to act as a "platform cart" so that the bed of the cart is flat with one side upright so as to accommodate long 24-channel mixing consoles or lighting trusses that would overhang the ends of the cart.

Since the equipment must be transported over various terrains, the cart should have the quality suitable for rolling smoothly and shock-free over such various terrains. The wheeled mechanism of the dolly or cart should be suitable for traversing curbs, stairs, grass, dirt and rough pavement. The cart should provide a broad frame surface so as to easily receive the musical equipment. A non-skid surface is useful in order to prevent odd-shaped instruments and widely-used polyethylene cases (which are notoriously slippery) from slipping and falling off during transport. The cart should be able to be converted from a two-wheel hand truck to a four-wheel cart or any other configuration both extremely quickly and efficiently. Since the cart must be loaded and unloaded often between musical performances, complete assembly into any loading configuration should be completed within ten seconds.

It is often the requirement of musicians that they must set up extremely quickly and must break down the equipment quickly. As such, it is a requirement for a musical instrument transport cart that the cart be able to be assembled into its proper position for receiving equipment very quickly and easily. Undue manipulation of screws, nuts, bolts, and other items wastes a great deal of time and is generally unsuitable for the purposes of the musician. A musical instrument transport cart must be capable of rapid assembly. The cart should also be capable of assuming any configurations within ten seconds or less. The cart should also be able to carry small objects on the frame without falling through.

A caster brake is necessary so as to allow the cart to be retained on uneven surfaces.

It is also important for musical equipment to be maintained on a surface parallel to the surface on which the cart is travelling. As such, the frame of the cart should be supported on wheels which maintain the frame in parallel relationship to the earth. Any angling of the frame will tend to cause the equipment to move to the lowest end of the cart. The angling may also cause excessive and unexpected pressures to be applied to cart components. In order to enhance the ability to maintain the parallelism of the cart to the surface, the handle should be foldable in such a way so as to maintain this parallelism.

Various patents have issued in the past which deal with various types of collapsible hand trucks and dollies. U.S. Pat. No. 1,662,730, issued on Mar. 13, 1928, to Wertenberger et al. shows a stylized truck having a broad surface with suitable caster wheels for transporting bathtubs. U.S. Pat. No. 2,519,113, issued on Aug. 15, 1950, to L. I. Cohn shows a hand truck having a collapsible handle at one end, a stair climbing apparatus, and an adjustable frame. U.S. Pat. No. 2,620,041, issued on Dec. 2, 1952, to Chenette et al. shows a truck having a treaded stair climbing attachment. U.S. Pat. No. 2,820,643, issued on Jan. 21, 1958, to L. I. Cohn shows a hand truck and dolly having an adjustable handle for converting the truck into a dolly. U.S. Pat. No. 3,104,890, issued on Sep. 24, 1963, to N. Hill shows a utility cart having telescoping tubular frame members. U.S. Pat. No. 3,206,790, issued on Sep. 21, 1965, to C. Romay describes a locking assembly for a swiveled caster as used on trucks and other carts. U.S. Pat. No. 3,759,538, issued on Sep. 18, 1973, to A. J. Fabiano illustrates a mobile storage facility having wheels and handles for supporting a tray for garden implements, accessories, and supplies. U.S. Pat. No. 3,761,107, issued on Sep. 25, 1973, to Dochery et al. shows an adjustable dolly for supporting furniture thereon. U.S. Pat. No. 3,837,667, issued on Sep. 24, 1974, to M. A. Sernovitz shows an open-framed cart for receiving containers stacked in a nested relationship. U.S. Pat. No. 4,009,891, issued on Mar. 1, 1977, to O. Jensen provides a hand truck and dolly with an adjustable frame and support chassis. U.S. Pat. No. 4,448,440, issued on May 15, 1984, to R. H. Gier discloses a hand truck having a load supporting platform pivotted to swing from an operative position to a position flush against the frame. U.S. Pat. No. 4,637,626, issued on Jan. 20, 1987, to Foss et al. shows a portable, foldable and convertible luggage trolley. U.S. Pat. No. 4,717,168, issued on Jan. 5, 1988, to J. R. Moon discloses a utility cart having a pair of balloon tire wheels supporting a frame counterbalanced for easy pushing. A pair of caster wheels are provided on the front of the inclined frame. U.S. Pat. No. 4,796,909, issued on Jan. 10, 1989, to V. S. Kirkendall describes a four wheeled pull-type service cart designed to transport heavy loads over sandy terrain. European Patent No. 294,249 shows a dolly having a detachable tubular structure which provides an extendible platform.

U.S. Pat. No. 5,228,716, issued on Jul. 20, 1993, to the present inventor teaches a convertible transport cart. After experimentation with the transport cart of this U.S. patent, it was found that several improvements were possible. First, it was found that the rectangular frame, although strong, lacked a certain degree of structural integrity. Additionally, it was found that the rectangular frame of this patent inhibited the ability to transport certain small articles (i.e., those articles that had a length less than the width between the bars of the frame). Often, musicians would complain that certain small objects could not be conveniently transported by the cart because of the wide spacing between the sides of the frame. Another problem which was noted was when the cart was configured in its "hand truck" position, there were occasions when the telescoping U-shaped members would slide from one another, especially if the thumbnuts were not sufficiently tightened. The lack of a safeguard mechanism to prevent the members from telescoping apart was a concern to certain users of the cart.

It is an object of the present invention to provide a convertible cart designed to be use in combination with the transport of musical equipment.

It is an object to provide a cart that will carry up to five hundred pounds, will extend to fifty-two inches in length, weigh less than thirty-five pounds, and collapse to thirty-six inches in length for storage, be durable, and be relatively inexpensive.

It is another object of the present invention to provide a telescoping and collapsible cart for easy storage.

It is another object of the present invention to provide foldable handles having a sufficient height to allow for efficient stacking and carrying of delicate musical equipment as well as for allowing for easy storage.

It is another object of the present invention to provide a cart that is long enough so that the handle folds flat within the framework of the cart.

It is a further object of the present invention to provide a locking mechanism for the handles of a cart which allows the handles to be positioned up or down within one second each.

It is a further object of the present invention to provide a cart having handles and a frame that can be arranged so as to maintain a parallel relationship with the earth.

It is still a further object of the present invention to provide a cart that can be easily transported through airports and the like by having a folded length of three feet or less and a flat side for airport transport belts.

It is another object to provide a cart that has minimal protrusions for the prevention of snagging, scraping, and injury.

It is another object to provide a cart that will carry smaller objects as well as larger objects without slipping through the frame.

It is another object of the present invention to provide a cart that limits the amount of telescoping movement and for preventing telescoping separation of the cart.

It is a further object of the present invention to provide a cart that is convertible between a platform cart, a piano dolly, a two-wheel or four-wheel hi-stacker, and a storage unit configuration.

These and other objects and advantages of the present invention will become apparent from a reading of the attached specification and appended claims.

SUMMARY OF THE INVENTION

The present invention is a convertible cart for transporting objects which comprises a frame, a first handle connected to the frame adjacent one end of the frame, a second handle connected to the opposite end of the frame from the first handle, a pair of primary wheels attached to one end of the frame, and at least one secondary wheel attached to the opposite end of the frame. Each of the first and second handles is selectively movable between a first position generally perpendicular to the frame and a second position aligned with the frame. The wheels support the frame in a position parallel to the surface on which the wheels are placed.

The frame comprises a first U-shaped member and a second U-shaped member slidably engaging the first U-shaped member. The first and second U-shaped members are movable relative to each other for changing a length of the frame. A locking member is fastened to one of the U-shaped members so as to selectively engage the other of the U-shaped members. Specifically, a thumbnut is threadedly fastened to one of the U-shaped members on an underside of the frame. This thumbnut is rotatable to a position in abutment with the other of the U-shaped members.

The frame has a longitudinal member extending centrally of the frame. This longitudinal member has an end which is offset from overlying relationship with one end of the frame. The longitudinal member has a first portion slidably receiving a second portion. The first portion is affixed to the first U-shaped member. The second portion is affixed to the second U-shaped member. The second portion is telescopically received within the first portion. The second portion has a snap button positioned within the first portion adjacent an end of the second portion. The first portion has an opening formed adjacent one end on a bottom surface. The second portion has a hole extending through a bottom adjacent the end of the second portion. The snap button has a head received within the hole of the second portion. The head of the snap button engages the opening of the first portion when the hole aligns with the opening. The longitudinal member has an end affixed to a bracket. This bracket extends inwardly from the end of the frame. This arrangement allows the second handle to fold in coplanar alignment with the side of the sides of the frame frame.

The frame has a first stop member fastened to the frame adjacent to the first handle. The frame also has a second stop member fastened to the frame adjacent to the second handle. The first and second stop members are in abutment with the first and second handles when the handles are in the first position. The frame has a first axle member in engagement with the first handle. A second axle member is also connected to the frame for engagement with the second handle. The first handle is rotated between the first and second positions about this first axle member. The second handle is rotatable between the first and second positions about the second axle member. These axle members extend inwardly from the frame. Each of the axle members has a slide surface which allows the handle to slide longitudinally thereacross. Each of the first and second handles has a U-shaped configuration. A flexible cord extends between the ends of the handle so as to allow the handles to slide on the axle members.

The pair of primary wheels are pneumatic wheels. The secondary wheels are two pivoting caster wheels provided on opposite sides of one end of the frame. A lock is provided for selectively preventing rotation of the caster wheels.

A stair climber frame member is fastened to an underside of the frame adjacent to the primary wheels. This stair climber extends diagonally from the wheels to the frame.

BRIEF DESCRIPTION OF THE DRAWINGS

FIG. 1 is a perspective view of the present invention illustrating the expanded operable position for use as a dolly.

FIG. 2 is a perspective view of the present invention illustrating the configuration of the present invention as a two wheeled hand truck.

FIG. 3 is a perspective view of the present invention showing the handles in their collapsed position.

DETAILED DESCRIPTION OF THE INVENTION

Figure 4:
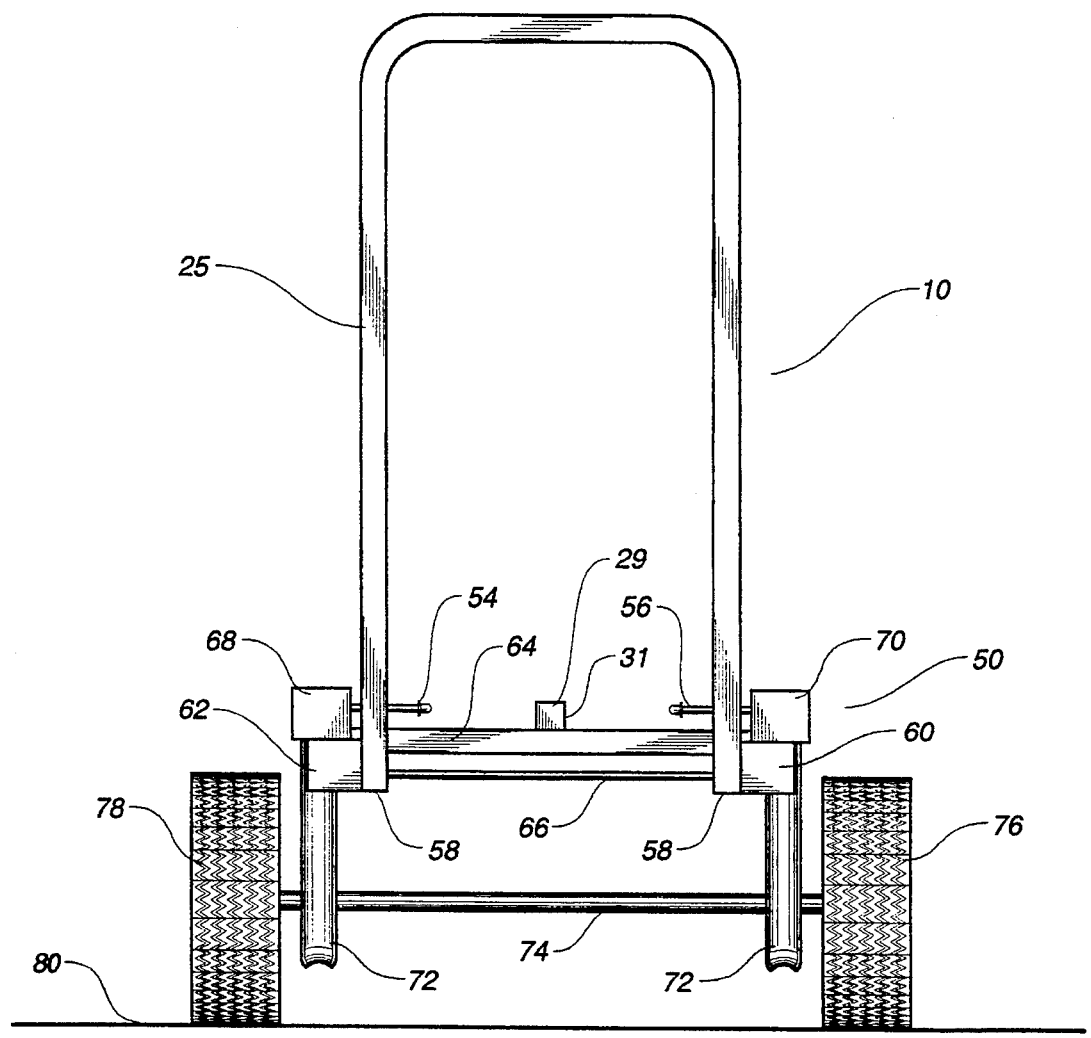
FIG. 4 is an end view of the cart of the present invention showing, in particular, the configuration of the locking mechanism.

With reference to the drawings, FIG. 1 illustrates the present invention in its fully extended position. The frame 11 of cart 10 is made of preferably a mild square tubular steel which is structurally light. The frame 11 is comprised of slidably cooperating U-shaped square tubing divided into two sections. The main frame bed 12 and the telescoping frame section 13 are provided so as to form the frame 11. Telescoping frame section 13 slidably engages the main frame 12. The frame 11 may be welded or bonded by mechanical means such as by bolts 14. The main frame bed 12 includes a non-skid surface 19 for reduced possibility of accidental slipping of equipment.

A stair climber attachment 15 is secured to the lower end of the main frame bed 12. The stair climber attachment 15 includes axle 16 for supporting two primary pneumatic wheels 17 and also serving as a lateral support bar 18 for bracing the main frame bed 12. Another lateral support bar 20 is placed where the telescoping frame section 13 and the main frame bed interconnect. This reinforces the midsection of the frame 11. Additional reinforcement is provided by the use of heavy duty thumbnuts 21. The thumbnuts 21 are threadedly received on the underside of main frame bed 12 on each side of the frame bed. Thumbnuts 21 can be rotated so as to move in abutment with the telescoping frame section 13. This serves to lock the telescoping frame section 13 in position relative to the main frame bed 12. The thumbnuts 21 are located on the underside of the main frame bed 12 so as to avoid snagging of equipment or objects located on the top or sides of the cart 10.

A brace 22 extends down from and is attached to the front or top end of the telescoping frame section 13. Brace 22 is of a suitable size to serve as a support 23 for the secondary wheels 24. Secondary wheels 24 are preferably pivoting casters for ease in direction change. Brace 22, in combination with secondary wheels 24, allows for uniform balance of the front and back of cart 10.

Inverted U-shaped equipment support handles 25 and 25a are symmetrically placed on opposite ends of frame 11. The equipment support handles 25 and 25a are releasably attached to the frame by suitable hinges 26 for ease in collapsing equipment support handles 25 and 25a. The handles 25 and 25a are also locked into place by suitable mechanical means, to be described hereinafter in conjunction with FIGS. 4-6.

Each of the handles 25 and 25a is supported on axle members 27. Handles 25 and 25a can rotate about axles 27 from a first position to a second position. The first position of handles 25 and 25a is illustrated in FIG. 1. Handles 25 are in a position perpendicular to the frame 11 of cart 10. The second position of handles 25 and 25a is shown in FIG. 3 in which the handles 25 and 25a are rotated about axles 27 so as to assume a position parallel to and aligned with the frame 11. The ability to rotate the handles 25 and 25a about axles 27 enhances the capabilities of the present invention. A specialized mechanism is provided for locking the handles in proper position.

As can be seen in FIG. 1, there is at 29 a longitudinal member extending centrally of the frame 11. This longitudinal member 29 has one end 31 which overlies a top surface of an end portion 33 of frame 11. Another end 35 of longitudinal member 29 is offset from the overlying relationship with the end 37 of the frame 11. The area of this offset relationship is indicated by the circled area A and will be described hereinafter. As can be seen, the longitudinal member 29 includes a first portion 41 and a second portion 43. The first portion 41 slidably receives the second portion 43 therein. As a result, when it is necessary to extend the length of the frame 11, the portions 41 and 43 of the longitudinal member 29 can slide with the sliding of the remaining U-shaped portions of the frame. After experimentation, it was found that the addition of the longitudinal member 29 greatly improved the structural stability of the cart 10 beyond expectations. The addition of the longitudinal member 29 greatly enhances the capacity of the cart to carry heavy loads. Additionally, the longitudinal member 29 allows the frame 11 to retain objects thereon that have a length less than the width between the sides of the frame. As was stated previously, it had been a problem where small objects could fall between the sides of the frame 11. The longitudinal member 29 now serves to retain objects that would otherwise fall between the sides of the frame. Importantly, the offset relationship between the end 35 of the longitudinal member 29 and the top surface of the end 37 of frame 11 allows the handle 25 to be properly lowered so as to be in coplanar relationship with the sides of the frame 11.

In FIG. 2, it can be seen that the handle 25*a* is rotated about axles 27 so as to be aligned with the frame 11. The handle 25*a* is contained within the perimeter formed by frame 11. The other handle 25 is placed in its first position perpendicular to the frame 11. In the position illustrated in FIG. 2, the cart 10 assumes a hand truck configuration.

FIG. 3 illustrates the cart 10 in its configuration as a four-wheel flatbed cart. In FIG. 3, the handles 25 and 25*a* are both rotated about axles 27 so as to be placed in their second position. The second position is a flat position on the frame 11. It can be seen that one handle 25 is received within the sides of frame 11 and is generally coplanar with the area of frame 11. The offset relationship between the end 35 of longitudinal member 29 and the end 37 of frame 11 permits handle 25 to be folded in this coplanar relationship with the sides of frame 11. The other handle 25*a* is hinged to axles 27 slightly above the top surface of frame 11. This causes the other handle 25*a* to assume a position juxtaposed against the top surface of frame 11 and arranged parallel to frame 11. In either of the configurations, the top surface of the cart 10 of the present invention will be flat and parallel to the surface upon which the cart 10 rests.

The stair climber attachment 15 supports the frame 11 a distance above pneumatic wheels 17. The stair climber attachment 15 extends generally diagonally from the wheels 17 to the frame 11. Similarly, the brace 22 and the support 23 supports the frame 11 a distance above the caster wheels 24. It is important to the embodiment of the present invention that the frame 11 be supported so as to be parallel above the surface upon which the cart 10 rests. As such, the structural members are configured so as to provide this levelling of the frame 11 above the wheels. The primary wheels 17 are positioned on opposite sides of frame 11. Similarly, the caster wheels 24 are placed on opposite sides of frame 11. The pneumatic wheels 17 allow the cart 10 to be moved along various types of terrain. The pneumatic wheels 17 allow the cart to be moved without shock to the contents on the frame 11. The wheels 17 can be inflated to any desired pressure.

The use of the mild durable square tubular steel material is, by structural design, light enough in weight to be manually lifted onto a truck or into an automobile trunk. It is also structurally sound enough to withstand and support as much as 500 pounds of equipment. The overall empty weight of the cart 10 should not exceed forty pounds. The square tubular steel is preferred because it allows for a larger surface area on the frame 11 than does rounded tubing. Non-skid adhesive tape, or the like, is applied to the top surface of the main frame bed 12 so as to reduce the possibility of equipment slipping from the cart.

The telescoping frame 11 allows for compact storage when the cart 10 is not in use. This is important given the limited space often available to musicians. The cart achieves maximum hauling capacity when the frame 11 is fully extended. The ends of the cart 10 are designed to be bilaterally symmetrical and are of sufficient height to allow for efficient stacking of musical equipment. The ends releasably collapse to the frame 11 for convenient storage. Foamed handles may be provided on the top of handles 25 for the comfort of the user.

The stair climbing device 15 is attached to the bottom of the cart 10 to aid in ascending and descending stairs. The primary wheels 17 are located at the bottom end of the cart and use part of the stair climbing device as an axle. These primary wheels are preferably pneumatic for a smooth ride on rough terrain. The secondary wheels 24 are located on the opposite end of the cart and are preferably pivoting caster wheels for ease and direction change and maneuverability.

The lateral support bars 18 and 20 are placed perpendicular in the frame to help support equipment and reinforce the structural stability of the frame 11. The frame 11 is actually made of two separate pieces, the main frame bed 12 and the telescoping frame bed 13. The attachment of telescoping frame section 13 to the main frame bed 12 is further enhanced by the use of the heavy-duty thumbnut which affixes the sections in position relative to each other. Additionally, as will be described hereinafter, a snap button is received within a portion of the telescoping longitudinal member 29. This snap button serves to limit and safeguard the relative movement of the telescoping sections of frame 11.

FIG. 4 shows an end view of the cart 10 of the present invention. FIG. 4 illustrates, in particular, the configuration of the locking mechanism 50 in accordance with the preferred embodiment of the present invention. As can be seen in FIG. 4, cart 10 includes inverted U-shaped handle 25 which is rotatably connected to axle members 54 and 56. The ends 58 of handle 25 rest in abutment against a first stop member 60 and a second stop member 62. The other side of the ends 58 of handle 25 are in abutment with crossbar 64. In this position, the handle 25 is supported in a rigid upright position. The ends 58 cannot move because of their abutment with stop members 60 and 62 and with crossbar 64. A cord 66 is fastened adjacent to the ends 58 of handle 25 and extends between the ends 58 in generally close proximity to the axle members 54 and 56 and near the stop members 60 and 62.

The first axle member 54 is rigidly affixed in position and extends inwardly from frame portion 68. Similarly, the second axle member 56 is rigidly supported by and extends inwardly from the frame portion 70. Frame portions 68 and 70 are supported by the stair climber attachment 72. Wheel axle 74 extends beneath the frame portions 68 and 70 and is received by the stair climber attachment 72. Wheel axle 74 rotatably supports the pneumatic wheels 76 and 78. Wheels 76 and 78 rest on surface 80. It can be seen that the frame of cart 10 resides parallel to the surface 80 when the cart is in the position illustrated in FIG. 4.

In FIG. 4, the longitudinal member 29 is shown as having end 31 affixed in overlying relationship with the crossbar 64. The longitudinal member 29 extends centrally of the frame.

Figure 5:
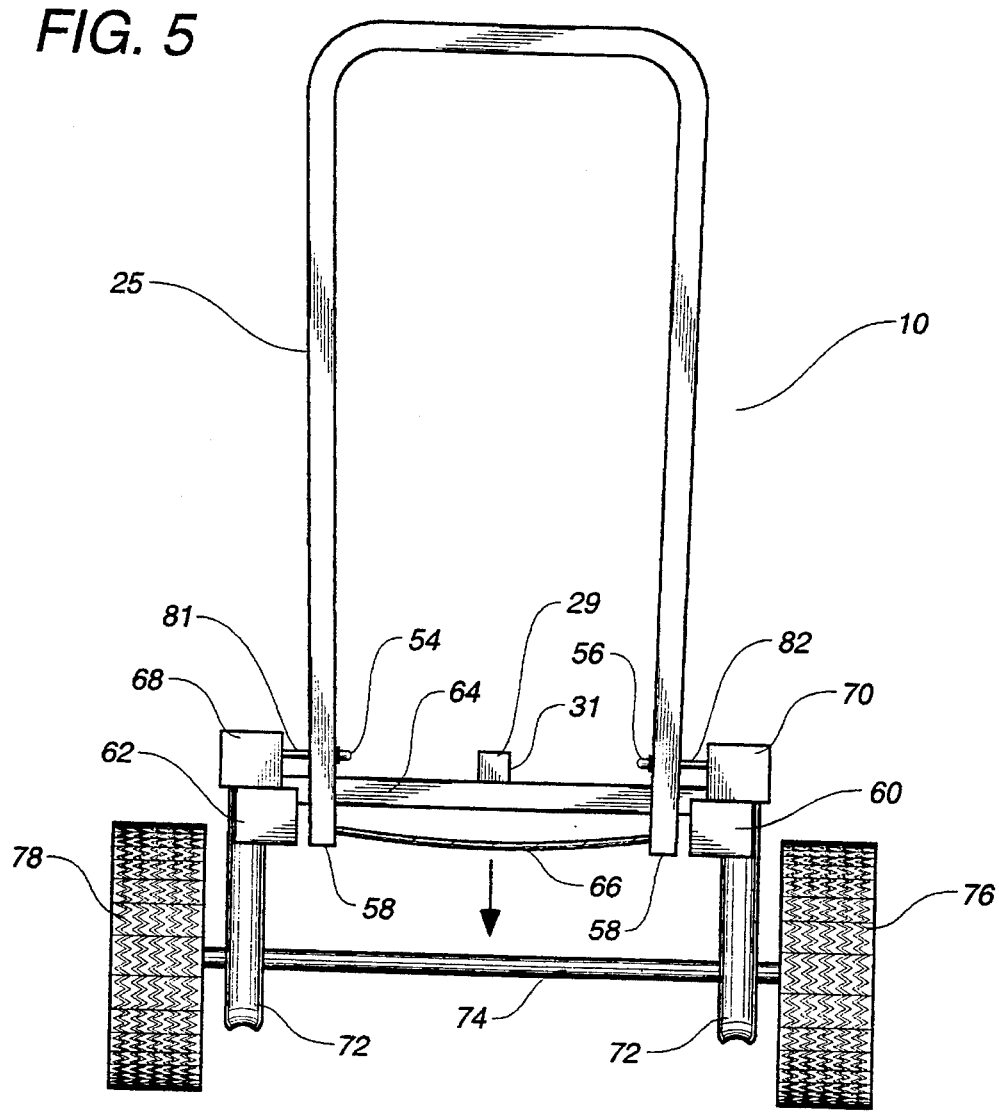
FIG. 5 is an end view similar to FIG. 4 showing, in particular, the workings of the locking mechanism.

FIG. 5 illustrates how the locking mechanism of the present invention actually operates so as to allow the handle 25 to move from its first perpendicular position to its position in alignment with the frame of cart 10. As can be seen in FIG. 5, a pressure is applied, either upwardly or downwardly to the cord 66. The application of a downward pressure to cord 66 causes the ends 58 of handle 25 to move inwardly toward each other. Additionally, this allows the handle 72 to move inwardly along the slide portion 81 of first axle member 54 and to slide inwardly along the slide surface 82 of second axle member 56. The slide surfaces 81 and 82 extend longitudinally along the axle members 54 and 56, respectively.

This movement causes the ends 58 to become clear of the stop members 60 and 62. It can be seen that the stop members 60 and 62 have a width that is less than the length of the slide surfaces 81 and 82 of axle members 54 and 56. After the ends 58 have cleared the stop members 60 and 62, the handle 25 is free to rotate about axle members 54 and 56. When the handle 25 lies flat against the frame, the cord 66 is released so that the ends return to their original position.

Figure 6:
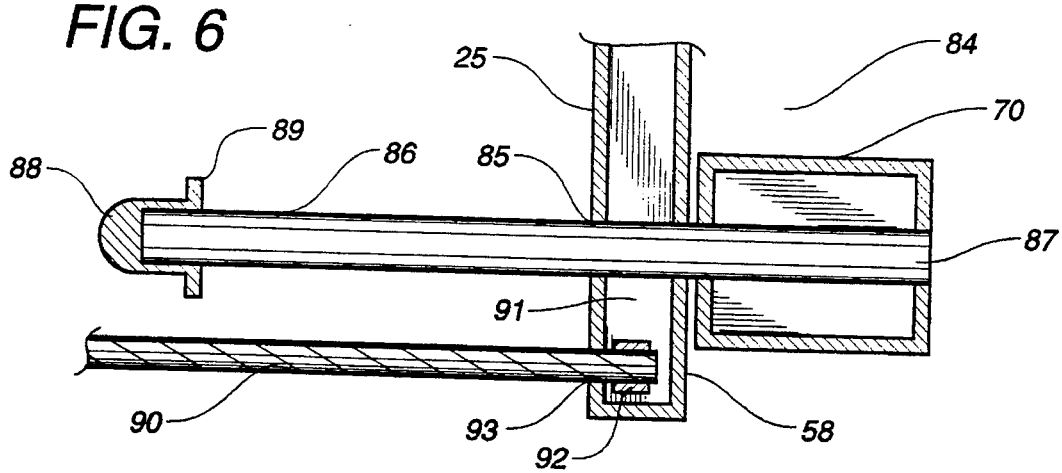
FIG. 6 is a detailed view, in cross-section, of the locking mechanism of the present invention.

FIG. 6 shows a detailed view of the configuration of the locking mechanism 84. Specifically, handle 25 has a hole 85 formed therethrough which receives the outer diameter 86 of axle member 56. End 87 of axle member 56 is rigidly fastened to frame portion 70. The axle member 56 can be welded, bolted, or otherwise rigidly fastened to the frame portion 70. The outer diameter 86 of axle member 56 forms a slide surface for the end 58 of handle 25. As such, the handle 25 is free to slide over the outer diameter 86 of axle member 56. A cap 88 is fastened to the far inward end of axle member 56. Cap 88 includes an abutment surface 89 which prevents further travel of handle 25 along slide surface 86 of axle member 56. The cord 90 is received by end 58 of handle 25. Cord 90, identified herein as a "pulling means", is fastened to the interior 91 of handle 25 by placing a crimping member 92 about the outer diameter of cord 90. Cord 90 extends from interior 91 through opening 93 at end 58 of handle 25.

This locking mechanism is unique to the present invention and further enhances the capabilities of the present invention. In particular, a simple downward motion on the cord 66 allows the handle to move from its first position to its second position. This can be done in a minimum of time. Additionally, the arrangement of the locking mechanism provides a rigid well-distributed structural support for the vertical position of the handles. This locking mechanism is placed on each end of the cart 10. It can be used for both handles.

Figure 7:
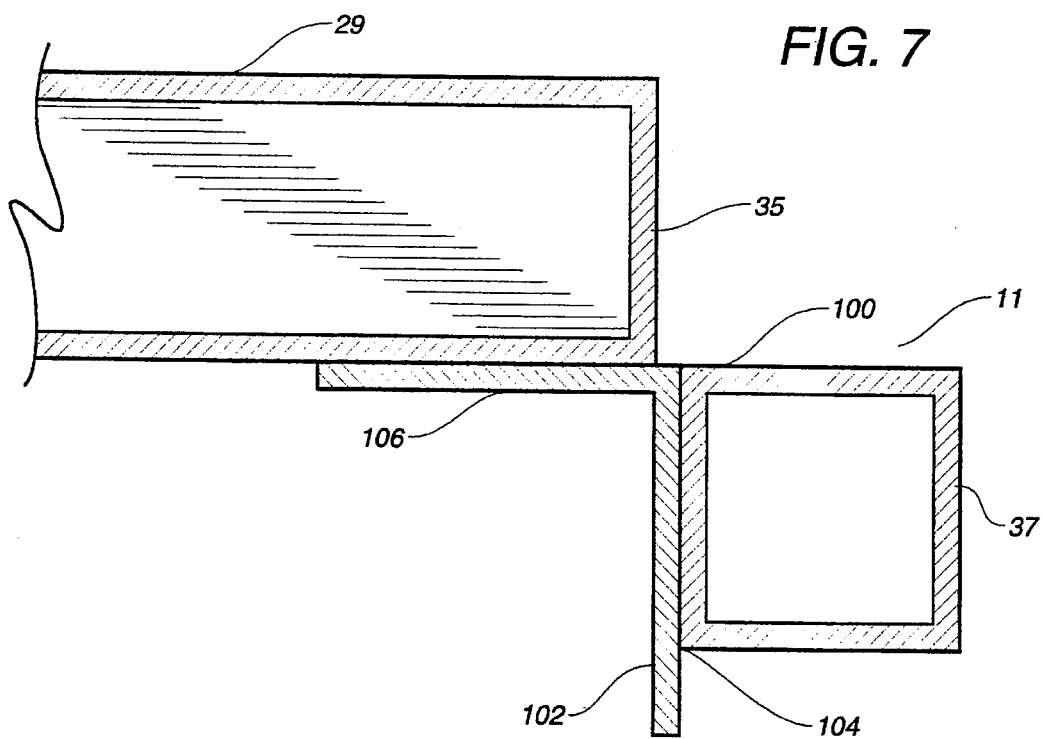
FIG. 7 is a cross-sectional view as taken of circled area "A" of FIG. 1.

FIG. 7 illustrates a detailed cross-sectional view of the circled area A of FIG. 1. In particular, FIG. 7 illustrates the offset relationship of the longitudinal member 29 with respect to the forward portion 37 of the frame 11. As can be seen, the frame 11 is made up of square tubular material. The first portion 37 supports the handle 25a thereon. The longitudinal member 29 has an end 35 positioned in proximity with the top surface 100 of the frame portion 37. Importantly, a bracket 102 has a side which is welded to an inner side 104 of frame portion 37. The bracket 102 is an L-shaped member which includes a surface 106 extending rearwardly of the frame portion 37. The portion 106 lies in a generally horizontal configuration and to the back of the top surface 100 of the frame portion 37. The longitudinal member 29 is welded to the surface 106 so as to reside in offset relationship from the top surface 100 of frame portion 37. As can be seen, the end 35 is positioned apart and separate from the top surface 100 of frame portion 37. In this configuration, it is now possible for the handle 25 to be folded so as to reside juxtaposed against the top surface 100 of the frame portion 37. If the longitudinal member 29 were extended so as to be in overlying relationship with the frame portion 37, then the handle 25 would not reside in coplanar relationship within the frame 11.

Although the illustration of FIG. 7 appears to be a relatively simple modification of the cart 10 of the present invention, it does achieve important results. The inclusion of the longitudinal member 29 was carried out to add extra structural stability and support to the frame 11. However, it was important to avoid the sacrifice of the perfectly flat arrangement of the handles 25 and 25a. The end 35 of the longitudinal member was required to reside in a position that would enhance the structural stability of the frame 11 while providing a proper space for the folding of handle 25. The arrangement of FIG. 7 accommodates this difficult problem.

Figure 8:
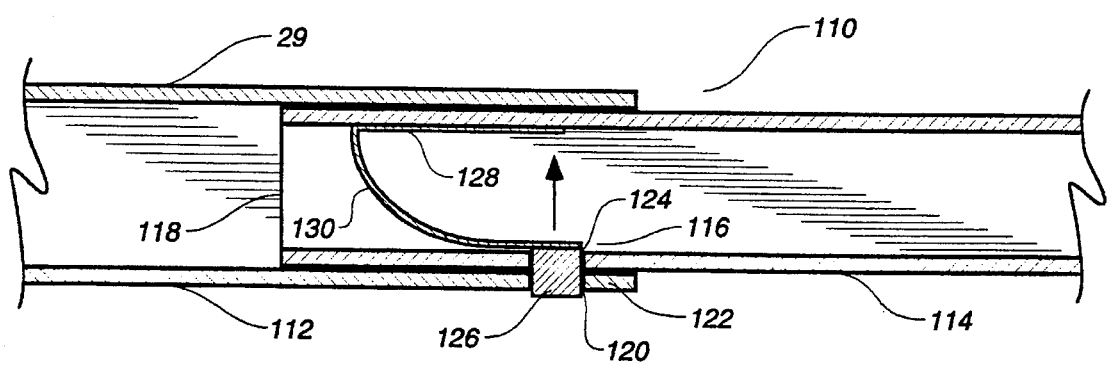
FIG. 8 is a cross-sectional view as taken of circled area "B" of FIG. 2.

FIG. 8 shows at 110 the cross-sectional configuration of the longitudinal member 29 as shown in circled area "B" of FIG. 2. As can be seen, the longitudinal member 29 has a first portion 112 slidably receiving a second portion 114. The first portion 112 is affixed to the first U-shaped member of the frame. The second portion 114 is affixed to the other U-shaped member of the frame. The second portion 114 is telescopically received within the first portion 112 so that the length of the longitudinal member 29 can be properly adjusted and set. The second portion 114 has a snap button 116 positioned within the first portion 112 adjacent an end 118 of the second portion 114. As can be seen, the first portion 112 has an opening 120 formed adjacent to end 122 on the bottom surface of the portion 112. The second portion 114 has a hole 124 extending through a bottom adjacent to the end 118 of the second portion 114. The snap button 116 has a head 126 that is received within the hole 124 of the second portion 114. As can be seen, the head 126 of the snap button 116 engages the opening 120 of the first portion 112 when the hole 116 aligns with the opening 120. The snap button 116 is a flexible member having an end 128 in surface-to-surface contact with an interior of the second portion 114. A tensioning portion 130 extends from the end 128 so as to cause the head 126 to be in compressive contact with the interior of the first portion 112.

In normal use, when the second portion 114 telescopes outwardly relative to the first portion 112, the hole 124 will come into alignment with the opening 120. When this occurs, the tensioning member 130 of the snap button 116 will cause the head 126 to pass into and through the opening 120. The positioning of the head 126 essentially acts as a "stop" to the movement of the second portion 114 with respect to the first portion 112. As a result, the extended movement of the frame 11 is effectively limited. When it is desired to retract the frame, the head 126 can be pressed inwardly so as to allow the second portion 114 to be moved inwardly. The arrow in FIG. 8 illustrates the movement of the head 126 when it is desired to compress the frame.

The arrangement illustrated in FIG. 8 is particularly important to the operation of the cart 10 of the present invention. In previous embodiments of the present invention, it was found that when the frame is in the form of a hand truck (as illustrated in FIG. 2), the telescoping portions of the frame would separate. Often, the user of the cart 10 would forget to close the thumbnuts 21 or would not rotate the thumbnuts 21 with enough locking force. Occasionally, when the cart would be pulled upstairs, the sections would separate. As a result, it was necessary to incorporate a stop mechanism so as to prevent the inadvertent separating of the sections of the cart. The snap button 116 was provided so as to effectively safeguard against such separation. The snap button 116 also serves to inform the user when the limit of extension of the cart has been reached. This avoids the annoying situation where the sections accidentally separate.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A convertible cart for transporting objects comprising:
    a frame having a first end frame member and a second end frame member opposite said first end frame member, said frame having a first side frame member and a second side frame member extending between said first and second end frame members, said first and second side frame members being extendible, said frame having a generally rectangular configuration, said frame having a longitudinal member extending centrally of said frame, said longitudinal member having a first end affixed to said first end frame member and an opposite end affixed to and offset from overlapping relationship with said second end frame member of said frame, said opposite end of said longitudinal member being affixed to a bracket, said bracket being affixed to and extending inwardly from said second end frame member of said frame, said longitudinal member being movable between an extended position and a retracted position;

a first U-shaped handle having free end portions pivotally connected to said first and second side frame members adjacent said first end frame member;

a second U-shaped handle having free end portions pivotally connected to said first and second side frame members at a position above said second end frame member, each of said first and second handles being selectively movable between a first position generally perpendicular to said frame and a second position generally aligned with said frame, said first handle being in coplanar relationship with said first and second side frame members and having a transverse portion overlying said second end frame member when in said second position and when said longitudinal member is in said retracted position; and a plurality of wheels attached to said frame, said plurality of wheels being positioned adjacent said first and second side frame members of said frame, said longitudinal member and said side frame members having a top surface positioned a greater vertical distance from a bottom surface of said wheels than a top surface of said first and second end frame members.

2. The cart of claim 1, said frame having a first stop member fastened to said frame adjacent said first handle, said frame having a second stop member fastened to said frame adjacent said second handle, said first and second stop members being in abutment with said first and second handles when said handles are in said first position.

3. The cart of claim 2, said frame having a first axle member in engagement with said first handle, said frame having a second axle member in engagement with said second handle, said first handle rotatable between said first and second positions about said first axle member, said second handle rotatable between said first and second positions about said second axle member.

4. The cart of claim 3, said first and second axle members extending inwardly of said frame, said free end portions of said first handle being slidable along a surface of said first axle member, said free end portions of said second handle slidable along a surface of said second axle member.

5. The cart of claim 4, each of said first and second handles having a flexible cord connected to opposite ends of said U-shaped configuration, said cord extending across said U-shaped configuration of each of said handles.

6. The cart of claim 1, further comprising:

a stair climber frame member fastened to an underside of said frame adjacent at least one pair of said wheels, said stair climber frame member extending generally diagonally from said wheel to said frame.

* * * * *